US011022846B2

(12) United States Patent
Akiyama et al.

(10) Patent No.: US 11,022,846 B2
(45) Date of Patent: Jun. 1, 2021

(54) SUBSTRATE FOR DISPLAY DEVICE AND DISPLAY DEVICE

(71) Applicant: SHARP KABUSHIKI KAISHA, Sakai (JP)

(72) Inventors: Hiroto Akiyama, Sakai (JP); Tomofumi Kubota, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/626,229

(22) PCT Filed: Jun. 21, 2018

(86) PCT No.: PCT/JP2018/023614
§ 371 (c)(1),
(2) Date: Dec. 23, 2019

(87) PCT Pub. No.: WO2019/004051
PCT Pub. Date: Jan. 3, 2019

(65) Prior Publication Data
US 2020/0117057 A1     Apr. 16, 2020

(30) Foreign Application Priority Data
Jun. 28, 2017   (JP) .............................. JP2017-126276

(51) Int. Cl.
*G02F 1/1337*     (2006.01)
*G02F 1/1339*     (2006.01)
(Continued)

(52) U.S. Cl.
CPC ...... *G02F 1/133711* (2013.01); *G02F 1/1339* (2013.01); *G02F 1/13454* (2013.01); *G02F 1/133345* (2013.01); *G02F 1/1368* (2013.01); *G02F 1/133514* (2013.01); *G02F 1/133742* (2021.01)

(58) Field of Classification Search
CPC ................................................. G02F 1/133711
See application file for complete search history.

(56) References Cited

U.S. PATENT DOCUMENTS

| 2013/0077035 A1 | 3/2013 | Kanzaki et al. |
| 2016/0070130 A1* | 3/2016 | Yuminami ............ G02F 1/1337 349/110 |
| 2016/0116772 A1* | 4/2016 | Cha ..................... G02F 1/13394 349/123 |

FOREIGN PATENT DOCUMENTS

WO     2011/155133 A1   12/2011

* cited by examiner

*Primary Examiner* — Edmond C Lau
(74) *Attorney, Agent, or Firm* — ScienBiziP, P.C.

(57) ABSTRACT

A substrate for a display device includes a substrate, a first insulator disposed on the substrate, a second insulator disposed above the first insulator, an alignment film disposed above the second insulator, a first insulator main section being a section of the first insulator and disposed on an inner side than an outer edge of the substrate such that the first insulator is not disposed on an outer edge portion of the substrate, a film forming area restricting portion being a section of the second insulator and disposed on an outer edge portion of the substrate not to overlap the first insulator main section and restricting a film forming area in which the alignment film is to be formed, and an overlapping portion being a section of the first insulator and extending continuously from the first insulator main section and disposed to overlap the film forming area restricting portion.

8 Claims, 14 Drawing Sheets

(51) Int. Cl.
*G02F 1/1333* (2006.01)
*G02F 1/1345* (2006.01)
G02F 1/1335 (2006.01)
G02F 1/1368 (2006.01)

SUBSTRATE FOR DISPLAY DEVICE AND DISPLAY DEVICE

TECHNICAL FIELD

The present invention relates to a substrate for a display device and a display device.

BACKGROUND ART

An example of a liquid crystal display device described in Patent Document 1 has been known. The liquid crystal display device described in Patent Document 1 includes a first substrate that includes a wiring layer formed on a support substrate, an insulating film covering the wiring layer on the support substrate, and an alignment film formed by curing alignment film material having fluidity. The frame area includes a sealing member forming area. A recess portion is formed on the insulating film without penetrating therethrough. A portion of the recess portion overlaps the wiring layer seen from a normal direction to the surface of the support substrate. An edge end of the alignment film is supported by a bank of the recess portion and a bottom of the recess portion is exposed from the alignment film.

RELATED ART DOCUMENT

Patent Document

Patent Document 1: international Publication WO 2011/155133

Problem to be Solved by the Invention

The liquid crystal display device having the configuration described in Patent Document 1 includes a following configuration as a premise. The insulation film having the recess portion is a planarizing film made of acrylic resin, which is an organic insulating material, and the insulation film is disposed in a solid manner to extend to an outer edge of the support substrate. On the other hand, the planarizing film made of an organic insulating material may be disposed only in a middle section of the substrate and may not be disposed on an outer edge side portion of the substrate. In such a configuration, because the material of the alignment film supplied to the support substrate in forming the alignment film is likely to flow easily particularly on a path along the outer edge of the planarizing film, it is difficult to restrict a film forming area with the material of the alignment film in the recess portion.

DISCLOSURE OF THE PRESENT INVENTION

The present invention was made in view of the above circumstances. An object is to increase reliability of restricting a film forming area where a material of an alignment film is disposed.

Means for Solving the Problem

A substrate for a display device according to the present invention includes a substrate, a first insulator disposed on the substrate, a second insulator, an alignment film, a first insulator main section, a film forming area restricting portion, and an overlapping portion. The second insulator is disposed in a layer upper than the first insulator and having a thickness smaller than that of the first insulator. The alignment film is disposed in a layer upper than the second insulator. The first insulator main section is a section of the first insulator and is disposed on an inner side than an outer edge of the substrate such that the first insulator is not disposed on an outer edge portion of the substrate. The film forming area restricting portion is a section of the second insulator and is disposed on an outer edge portion of the substrate so as not to overlap the first insulator main section, and the film forming area restricting portion restricts a film forming area in which the alignment film is to be formed. The overlapping portion is a section of the first insulator and extends continuously from the first insulator main section and is disposed to overlap the film forming area restricting portion.

In such a configuration, in forming the alignment film, a material of the alignment film having fluidity is supplied onto the substrate and the material spreads over the second insulator on the substrate and the alignment film is formed. On the outer edge portion of the substrate on which the first insulator main section is not disposed, the film forming area restricting portion, which is a section of the second interlayer insulator disposed in a layer upper than the first insulator, is disposed. Therefore, the film forming area in which the material of the alignment film can be restricted on the outer edge portion of the substrate by the film forming area restricting portion.

However, the material of the alignment film that is supplied to the substrate in forming the alignment film is likely to flow particularly on a path along the outer peripheral edge of the first insulator main section. In some cases, the material may flow over the film forming area restricting portion. In this respect, the overlapping portion, which is a section of the first insulator having a greater film thickness than that of the second insulator, extends continuously from the first insulator main section and is disposed to overlap the film forming area restricting portion. Therefore, when the material of the alignment film flows on the path along the outer peripheral edge of the first insulator main section, the material of the alignment film is less likely to flow over the film forming area restricting portion whose height is increased by the overlapping portion. Accordingly, the forming area in which the material of the alignment film is surely restricted.

Advantageous Effect of the Invention

According to the present invention, reliability of restricting a film forming area where a material of an alignment film is disposed can be increased.

MODES FOR CARRYING OUT THE INVENTION

First Embodiment

Figure 1:
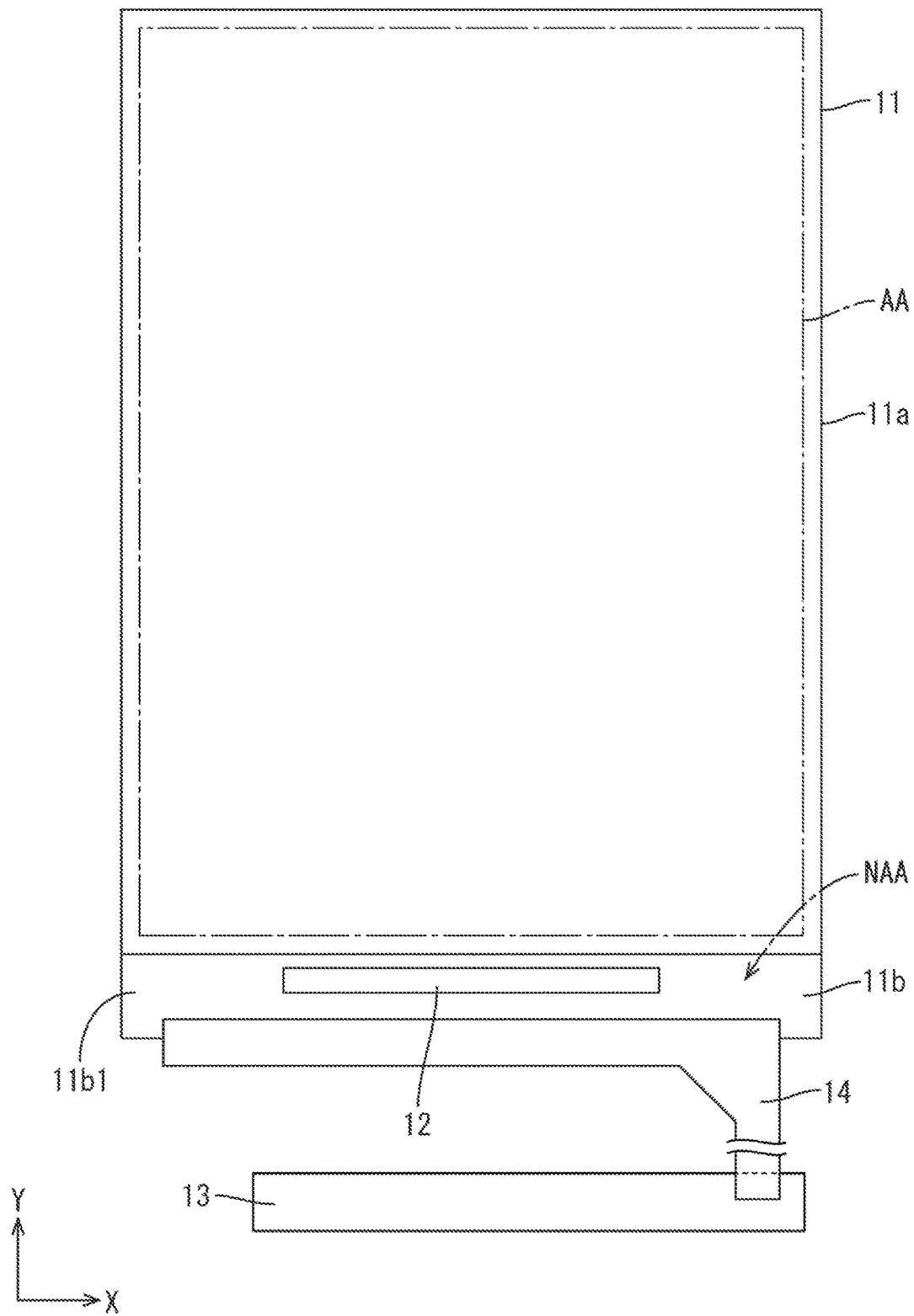
FIG. 1 is a plan view briefly illustrating a connecting configuration of a liquid crystal panel and a flexible circuit board according to a first embodiment of the present invention.

A first embodiment of the present invention will be described in detail with reference to FIGS. 1 to 11. In this section, a liquid crystal panel 11 (a display panel) included in a liquid crystal display device 10 will be described. In the drawings, X-axes, Y-axes, and Z-axes may be present. The axes in each drawing correspond to the respective axes in other drawings. Upper sides and the lower sides of FIG. 2 and FIG. 6 correspond to the front side and the rear side.

As illustrated in FIG. 1, the liquid crystal display device 10 at least includes the liquid crystal panel 11 displaying images, a driver 12 (a panel driving section, a driving circuit), a control circuit board 13 (an external signal supply source), a flexible circuit board 14 (an external connecting component), and a backlight unit (not illustrated). The driver 12 is configured to drive the liquid crystal panel 11. Various kinds of input signals are supplied from the control circuit board 13, which is an external component, to the driver 12. The flexible circuit board 14 electrically connects the liquid crystal panel 11 and the control circuit board 13, which is an external component. The backlight unit is disposed on a rear side with respect to the liquid crystal panel 11 and is an external light source that supplies light for displaying to the liquid crystal panel 11.

As illustrated in FIG. 1, the liquid crystal panel 11 has a vertically elongated square (quadrangular) overall shape. The liquid crystal panel 11 has a plate surface that is divided into a display area AA (an active area) where an image is displayed and a non-display area NAA (a non-active area). The display area AA is in a middle of the plate surface. The non-display area NAA has a frame shape surrounding the display area AA and has a frame shape in a plan view. In the liquid crystal panel 11, a short-side direction corresponds to an X-axis direction in each drawing and a long-side direction corresponds to a Y-axis direction in each drawing. A plate thickness direction corresponds to a Z-axis direction. In FIG. 1, an outline of the display area AA is indicated by a chain line and an area outside the chain line is the non-display area NAA.

Figure 2:
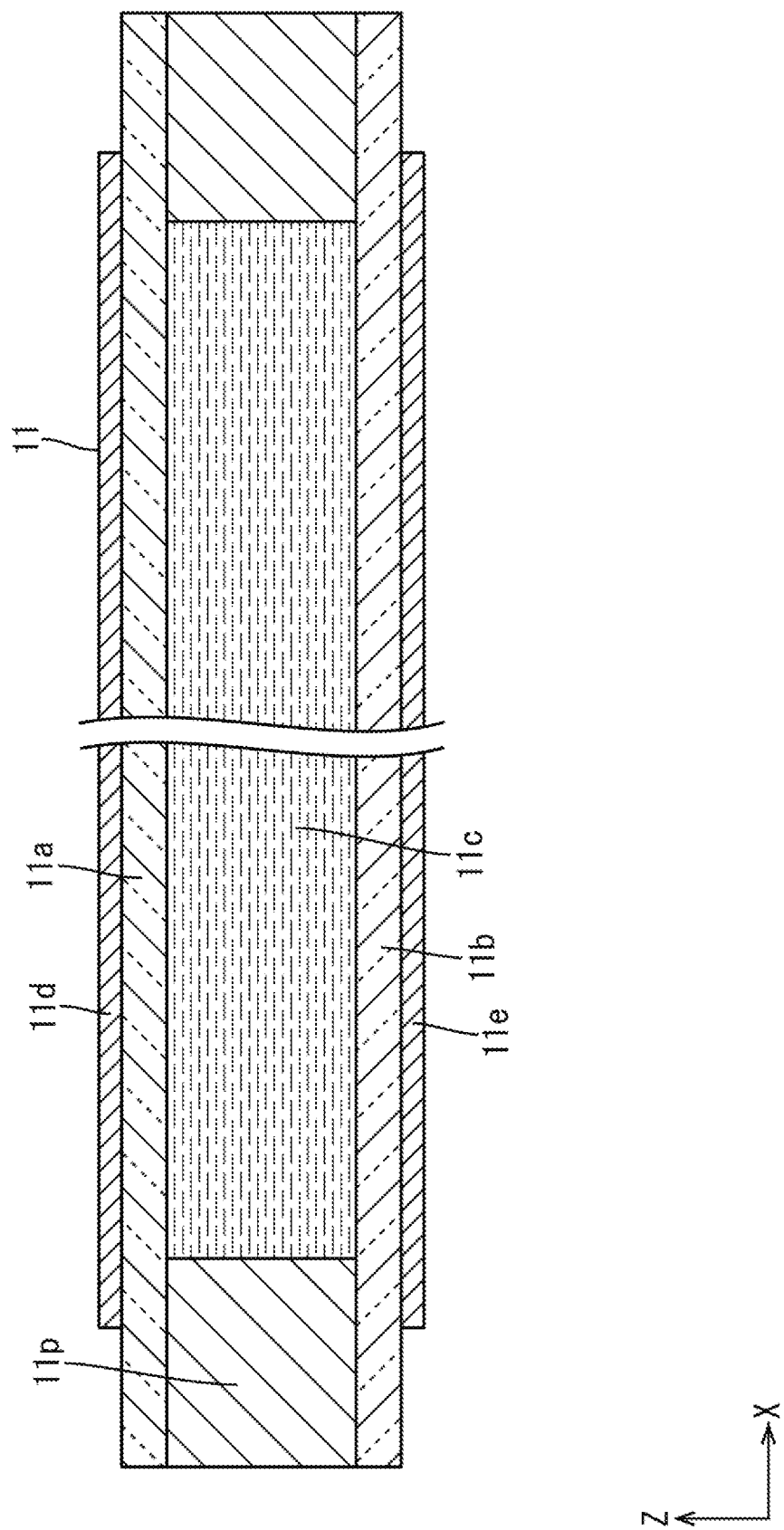
FIG. 2 is a cross-sectional view briefly illustrating a cross-sectional configuration of a whole liquid crystal panel.

As illustrated in FIG. 2, the liquid crystal panel 11 at least includes a pair of substrates 11a, 11b, a liquid crystal layer 11c (an inner space), and a sealant 11p. The liquid crystal layer 11c is disposed between the substrates 11a and 11b and includes liquid crystal molecules whose optical characteristics of the liquid crystal molecules are varied according to application of an electric field. The sealant 11p surrounds the liquid crystal layer 11c. The sealant 11p is disposed between the substrates 11a and 11b so as to seal the liquid crystal layer 11c while keeping a cell gap of a thickness of the liquid crystal layer 11c. One of the pair of substrates 11a and 11b on a front side (a front surface side) is a CF substrate 11a (a counter substrate) and another one on a rear side (a rear surface side) is an array substrate 11b (a substrate for a display device, an active matrix substrate, a TFT substrate). Each of the CF substrate 11a and the array substrate 11b includes a glass substrate 11GS (a substrate) and various kinds of films that are stacked in layers on an inner surface side of the glass substrate 11GS. The sealant 11p is disposed in the non-display area NAA of the liquid crystal panel 11 and has a vertically elongated substantially frame shape (FIG. 1) along the shape of the non-display area NAA in a plan view (seen in a normal direction to a plate surface of the substrates 11a, 11b). Polarizing plates 11d, 11e are bonded to outer surfaces of the substrates 11a, 11b, respectively.

Figure 3:
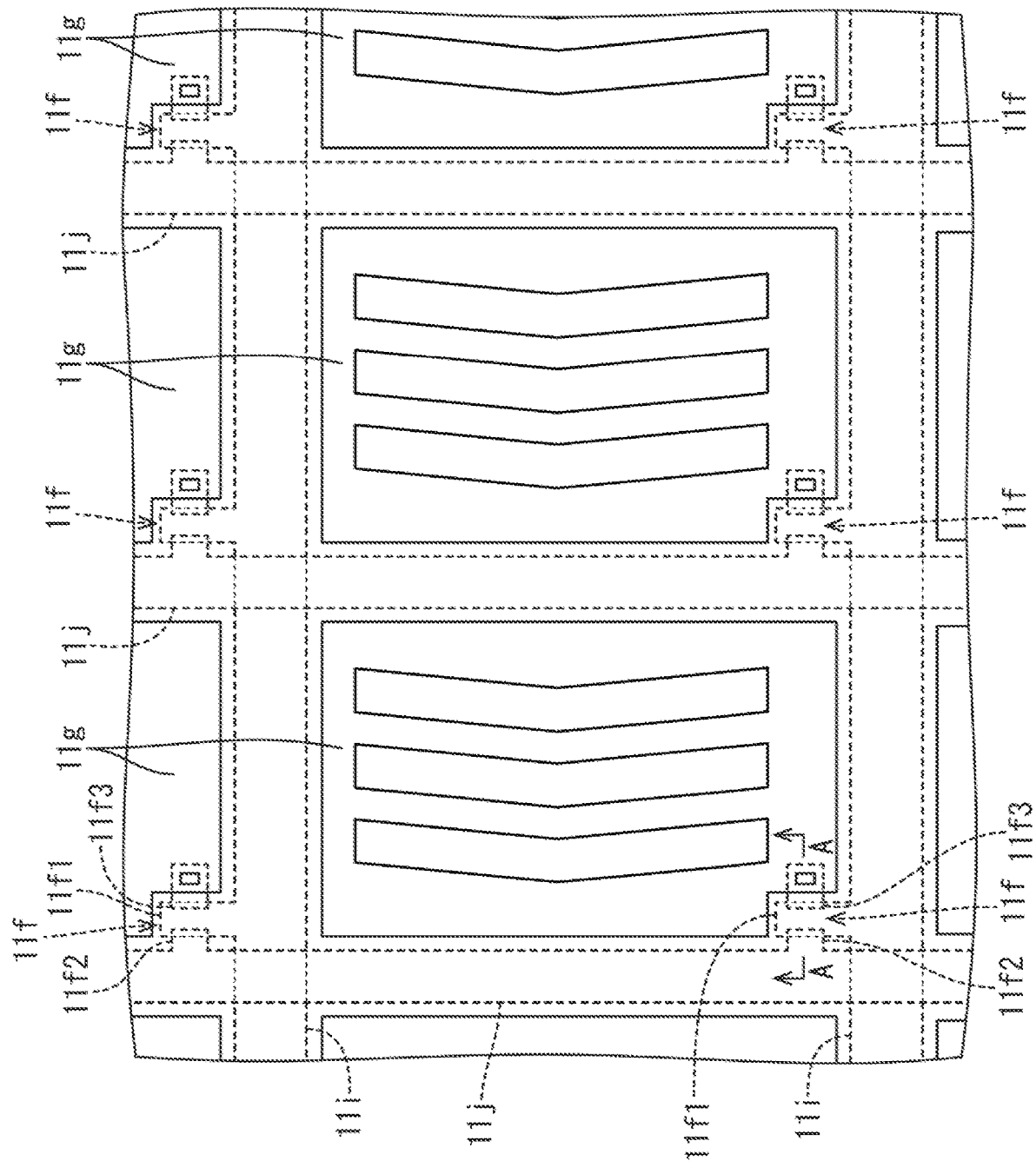
FIG. 3 is a plan view briefly illustrating a wiring configuration in a display area of an array substrate included in the liquid crystal panel.

As illustrated in FIG. 3, TFTs 11f (switching components, thin film transistors) and pixel electrodes 11g are arranged in a matrix (in rows and columns) on an inner surface side (a liquid crystal layer 11c side, a surface side facing the CF substrate 11a) of the array substrate 11b in the display area AA. Gate lines 11i (scanning lines) and source lines 11j (data lines, signal lines) are routed in a grid to surround the TFTs 11f and the pixel electrodes 11g. The gate lines 11i are connected to gate electrodes 11f1 of the TFTs 11f. The source lines 11j are connected to source electrodes 11f2 of the TFTs 11f. The pixel electrodes 11g are connected to drain electrodes 11f3 of the TFTs 11f. The TFTs 11f are driven based on signals supplied to the gate lines 11i and the source lines 11j. The application of potentials to the pixel electrodes 11g is controlled following the driving of the TFTs 11f. The pixel electrodes 11g are disposed in square areas surrounded by the gate lines 11i and the source lines 11j, respectively. A common electrode 11h is disposed in a solid manner on an inner surface side of the array substrate 11b in the display area AA to overlap the pixel electrodes 11g. The common electrode 11h is included in a layer upper than the pixel electrodes 11g. When a potential difference is created between the pixel electrode 11g and the common electrode 11h that overlap each other, a fringe electric field (an oblique electric field) affects the liquid crystal layer 11c. The fringe electric field includes a component along a plate surface of the array substrate 11b and a component normal to the plate surface of the array substrate 11b. Namely, the liquid crystal panel 11 in this embodiment operates in a fringe field switching (FFS) mode. In this embodiment, an extending direction of the gate lines 11i matches the X-axis direction and an extending direction of the source lines 11j matches the Y-axis direction in each drawing.

Figure 4:
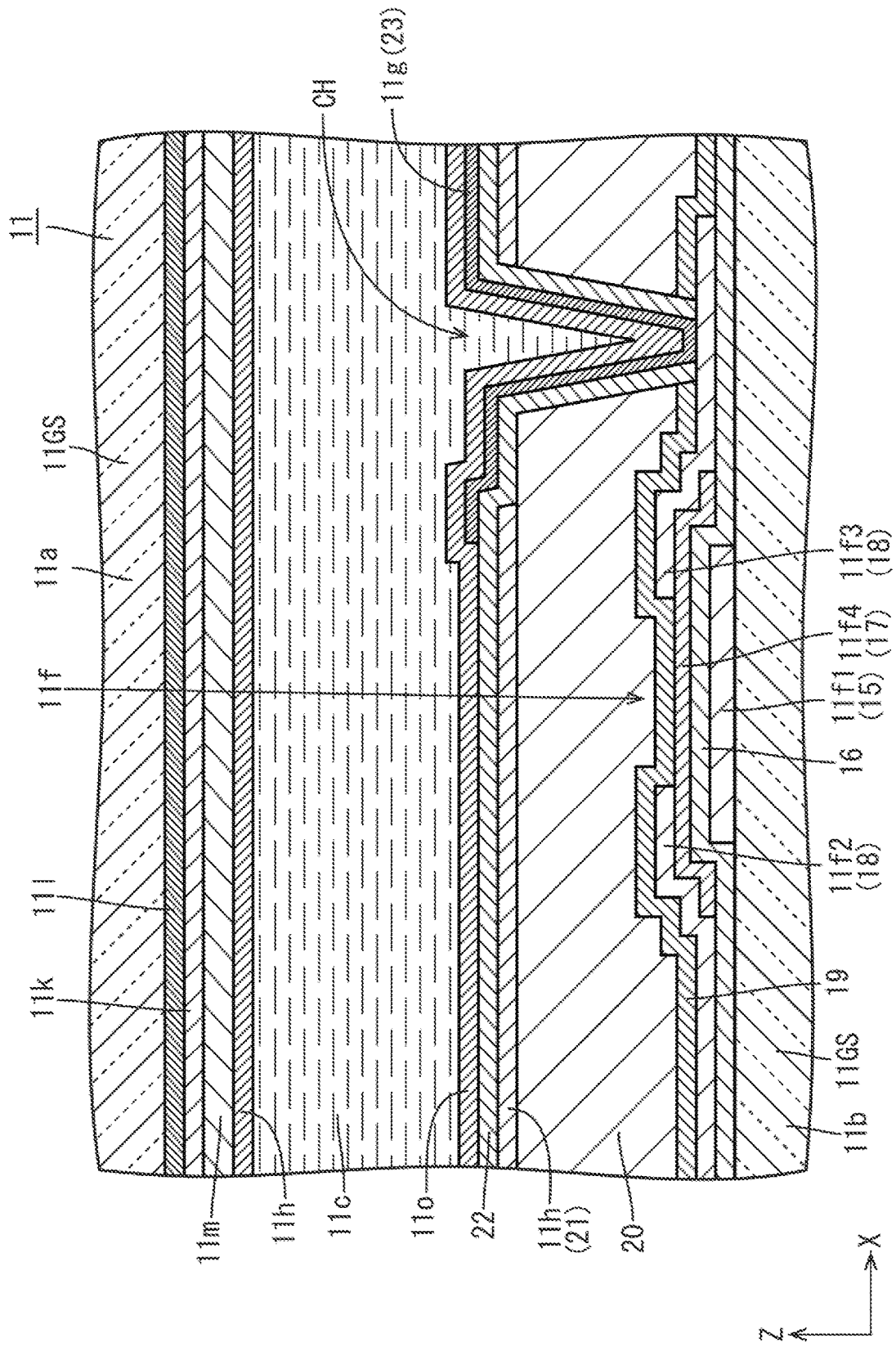
FIG. 4 is a cross-sectional view along line A-A in FIG. 3.

On an inner side of the CF substrate 11a in the display area AA, as illustrated in FIG. 4, color filters 11k are arranged in a matrix so as to be opposed the respective pixel electrodes 11g on the array substrate 11b side. The color filters ilk include red (R), green (G), and blue (B) color films in a predefined sequence. A light blocking film 11l (a black matrix) of a matrix shape is disposed between the adjacent color portions to reduce color mixture. The light blocking film 11l is disposed to overlap the gate lines 11i and the source lines 11*j* in a plan view. An overcoat film 11*m* is disposed on surfaces of the color filters 11*k* and the light blocking film 11*l*. Photo spacers, which are not illustrated, are disposed on the surface of the overcoat film 11*m*. In the liquid crystal panel 11, each of the color films of three colors of red (R), green (G), and blue (B) included in the color filters ilk and the three pixel electrodes 11*g* opposed thereto, respectively, form a display pixel, which is a display unit. The display pixel includes a red pixel including a R color filter 11*k*, a green pixel including a G color filter 11*k*, and a blue pixel including a B color filter ilk. The display pixels of three colors are arranged in a repeated manner along a row direction (the X-axis direction) on the plate surface of the liquid crystal panel 11 to configure a display pixel group. Multiple display pixel groups are arranged in a column direction (the Y-axis direction).

As illustrated in FIG. 4, alignment films 11*n*, 11*o* are included in the substrates 11*a*, 11*b* as layers that are disposed on the most inner side (closest to the liquid crystal layer 11*c*) and in contact with the liquid crystal layer 11*c*. The alignment films 11*n*, 11*o* are for aligning the liquid crystal molecules included in the liquid crystal layer 11*c*. The alignment films 11*n*, 11*o* are made of polyimide, for example, and are disposed in a solid manner over the display area AA and the non-display area NAA of the substrates 11*a*, 11*b*. The alignment films 11*n*, 11*o* are photo-alignment films for aligning the liquid crystal molecules along the light irradiation direction by irradiation of the light rays of a specific wavelength region (for example, ultraviolet rays).

Various kinds of films that are disposed on top of each other on an inner surface of the array substrate 11*b* will be described. As illustrated in FIG. 4, the array substrate 11*b* includes a first metal film 15 (a gate metal film), a gate insulator 16, a semiconductor film 17, a second metal film 18 (a source metal film), a first inter-layer insulator 19, a planarizing film 20 (a first insulator, a lower layer insulator), a first transparent electrode film 21, a second inter-layer insulator 22 (a second insulator, an upper layer insulator), a second transparent electrode film 23, and the alignment film 11*o* in this sequence from a lower side (a glass substrate 11GS side, a farthest side from the liquid crystal layer 11*c*).

The first metal film 15 has a multilayer film made of multiple kinds of metals or a singly-layer film made of one kind of metal. As illustrated in FIG. 4, the first metal film 15 includes sections that are configured as the gate lines 11*i* and the gate electrodes 11*f*1 of the TFTs 11*f*. The gate insulator 16 is made of an inorganic insulating material (an inorganic resin material). The semiconductor film 17 is a thin film including an oxide semiconductor as a material. The semiconductor film 17 includes sections that are configured as the channel sections 11*f*4 of the TFTs 11*f* connected to the source electrodes 11*f*2 and the drain electrodes 11*f*3. The second metal film 18 has a multilayer film made of multiple kinds of metals or a singly-layer film made of one kind of metal similar to the first metal film 15. The second metal film 18 includes sections that are configured as the source lines 11*j*, the source electrodes 11*f*2 and the drain electrodes 11*f*3 of the TFTs 11*f*. The first inter-layer insulator 19 is made of an inorganic insulating material. The planarizing film 20 is made of an organic insulating material (an organic resin material) such as acrylic resin (PMMA). The planarizing film 20 has a film thickness greater than that of other insulators 16, 19, 22 made of an inorganic resin material and the film thickness of the planarizing film 20 is about from 1.6 µm to 2.0 µm, for example. The surface of the array substrate 11*b* becomes flat by the planarizing film 20. The first transparent electrode film 21 is made of a transparent electrode material such as ITO and includes a section that is configured as the common electrode 11*h*. The second inter-layer insulator 22 is made of an inorganic insulating material such as SiNx and has a film thickness smaller than that of the planarizing film 20. The film thickness of the second inter-layer insulator 22 is about 0.15 µm and a ratio of the film thicknesses of the films 22 and 21 is about ⅒, for example. The second transparent electrode film 23 is made of a transparent electrode material and includes sections that are configured as the pixel electrodes 11*g*. The first inter-layer insulator 19, the planarizing film 20, and the second inter-layer insulator 22 include contact holes CH for connecting the pixel electrodes 11*g*, which are sections of the second transparent electrode film 23, and the drain electrodes 11*f*3, which are sections of the second metal film 18. Except for the contact holes CH, the first inter-layer insulator 19, the planarizing film 20, and the second inter-layer insulator 22 are disposed in a solid manner over an entire area of at least the display area AA. The alignment film 11*o* is disposed in a layer upper than the second transparent electrode film 23 and the second inter-layer insulator 22 so as to be directly opposed to the liquid crystal layer 11*c*.

Figure 5:
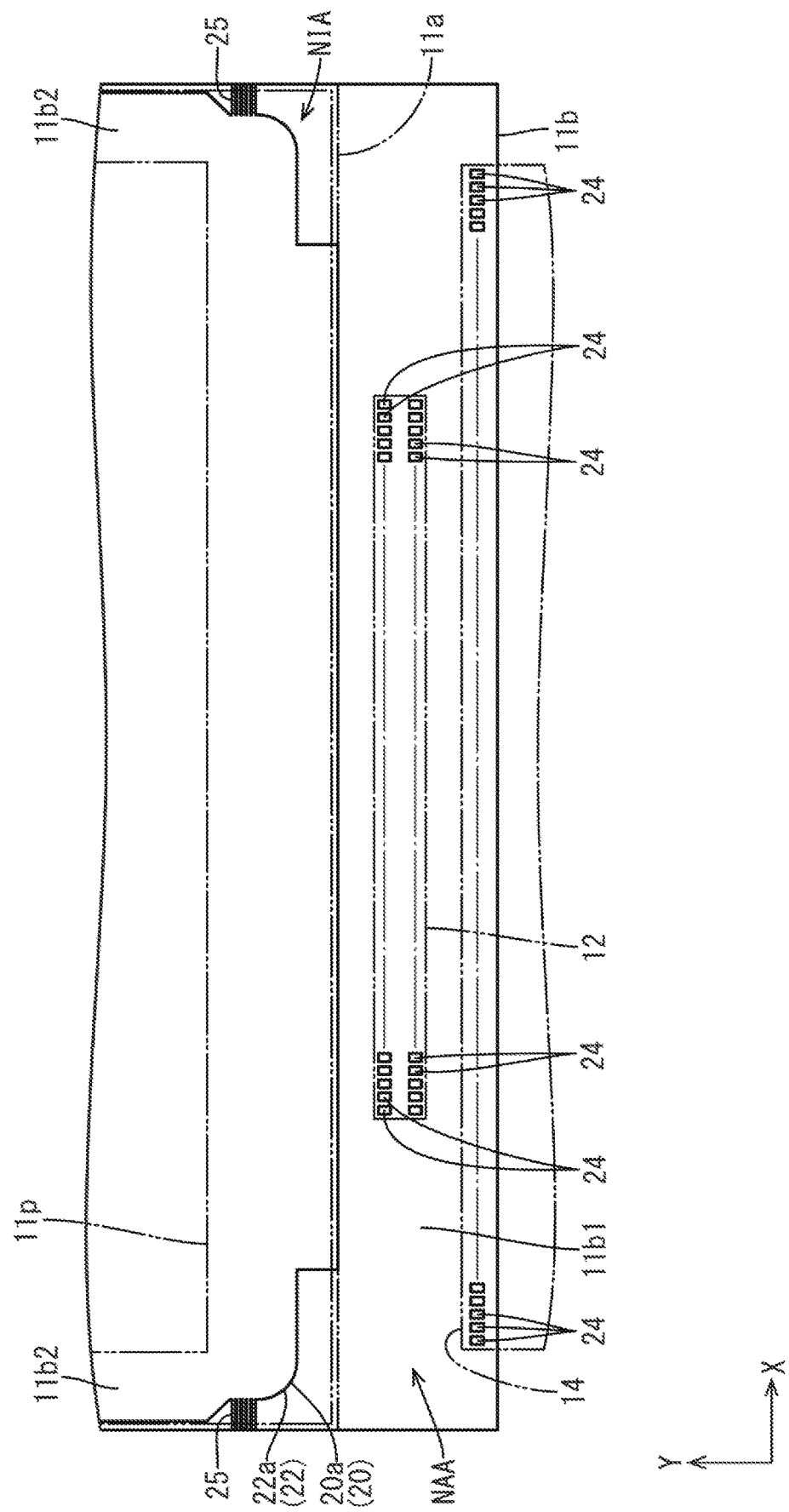
FIG. 5 is a plan view illustrating a planar configuration of the array substrate in film forming area restricting portions and overlapping portions.

As illustrated in FIG. 1, the CF substrate 11*a* included in the liquid crystal panel 11 has a long-side dimension that is shorter than a long-side dimension of the array substrate 11*b* and is bonded to the array substrate 11*b* such that one short-side sections of the CF substrate 11*a* and the array substrate 11*b* are aligned with each other. Another short-side section of the array substrate 11*b* with respect to the long-side direction projects toward side with respect to the CF substrate 11*a*. The array substrate 11*b* includes the other short-side section as a CF substrate non-overlapping portion 11*b*1 (a first side section) that is not overlapped with the CF substrate 11*a*. The CF substrate non-overlapping portion 11*b*1 is included in the non-display area NAA. A driver 12 and the flexible circuit board 14 are mounted on the CF substrate non-overlapping portion 11*b*1. As illustrated in FIG. 5, terminals 24 are disposed in a mounting area in the CF substrate non-overlapping portion 11*b*1 where the driver 12 and the flexible circuit board 14 are mounted. The terminals 24 are electrically connected to terminals (not illustrated) included in the driver 12 and the flexible circuit board 14 via an anisotropic conductive film (ACF). The terminals 24 are sections of the first metal film 15 and the second metal film 18 included in the array substrate 11*b*. The terminals 24 are arranged at intervals along the X-axis direction in the mounting area for the driver 12 and the flexible circuit board 14. In FIG. 5, outlines of the driver 12, the flexible circuit board 14, and the sealant 11*p* are indicated by chain double-dashed lines.

Figure 6:
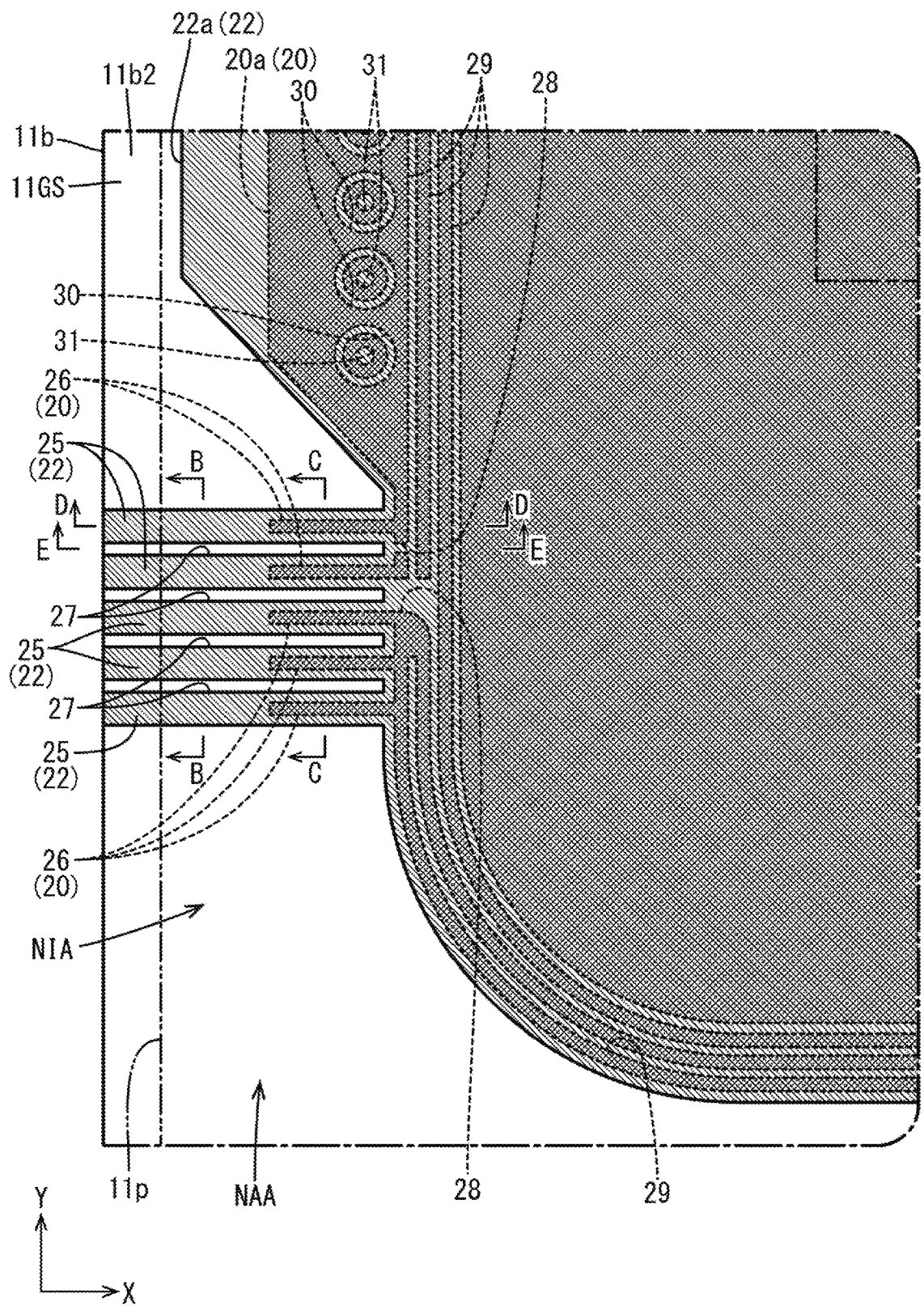
FIG. 6 is a plan view illustrating a planar configuration of a portion of the array substrate including the film forming area restricting portions and the overlapping portions and therearound.

Next, the forming areas in which the planarizing film 20 and the second inter-layer insulator 22 are to be formed in the non-display area NAA of the array substrate 11*b* will be described. As illustrated in FIG. 5, the planarizing film 20 and the second inter-layer insulator 22 are disposed in a substantially entire area of the display area AA and also extended to the non-display area NAA. The planarizing film 20 and the second inter-layer insulator 22 include a planarizing film main section 20*a* (a first insulator main section) and a second inter-layer insulator main section 22*a* (a second insulator main section). The planarizing film main section 20*a* and the second inter-layer insulator main section 22*a* are disposed in the area extending from the display area AA to the non-display area NAA and in a most area of the array substrate 11*b* except for the outer edge portion thereof. In FIG. 5, the forming areas in which the planarizing film main section 20*a* and the second inter-layer insulator main section 22*a* are formed are briefly illustrated with a solid line. The planarizing film main section 20*a* and the second inter-layer insulator main section 22*a* are disposed such that the outer peripheral edges thereof are on an inner side than an outer peripheral edge of the glass substrate 11GS. The planarizing film 20 and the second inter-layer insulator 22 are not disposed on the outer edge portion of the glass substrate 11GS. The planarizing film main section 20*a* and the second inter-layer insulator main section 22*a* are formed such that most portions of the outer peripheral edges thereof are straight and extend along the outer peripheral edge of the array substrate 11*b* and corner portions of the outer peripheral edges thereof are on an inner side than the outer peripheral edge of the array substrate 11*b* and include curved portions. The planarizing film main section 20*a* and the second inter-layer insulator main section 22*a* are almost not disposed on the CF substrate non-overlapping portion 11*b*1 of the array substrate 11*b*. In detail, as illustrated in FIG. 6, the second inter-layer insulator main section 22*a* has its forming area that is slightly larger than that of the planarizing film main section 20*a*. The second inter-layer insulator main section 22*a* is disposed to cover an entire area of the planarizing film main section 20*a*. Accordingly, the planarizing film main section 20*a* that is made of an organic insulating material is less likely to be exposed outside and less likely to absorb moisture. The films other than the planarizing film 20 and the second inter-layer insulator 22 are not illustrated in FIG. 6. In FIG. 6, the forming areas in which the planarizing film 20 and the second inter-layer insulator 22 are formed are indicated by different shadings and an overlapping area in which the planarizing film 20 and the second inter-layer insulator 22 are overlapped with each other are indicated by a shading obtained by overlapping the different shadings. The non-display area NAA of the array substrate 11*b* includes a portion that is outside the main sections 20*a*, 22*a*. Most of the portion outside the main sections 20*a*, 22*a* except for film forming area restricting portions 25 and overlapping portions 26, which will be described later, is an insulator non-disposed area NIA in which the planarizing film 20 and the second inter-layer insulator 22 are not disposed. Namely, almost an entire area of the CF substrate non-overlapping portion 11*b*1 of the array substrate 11*b* is the insulator non-disposed area NIA.

Figure 11:
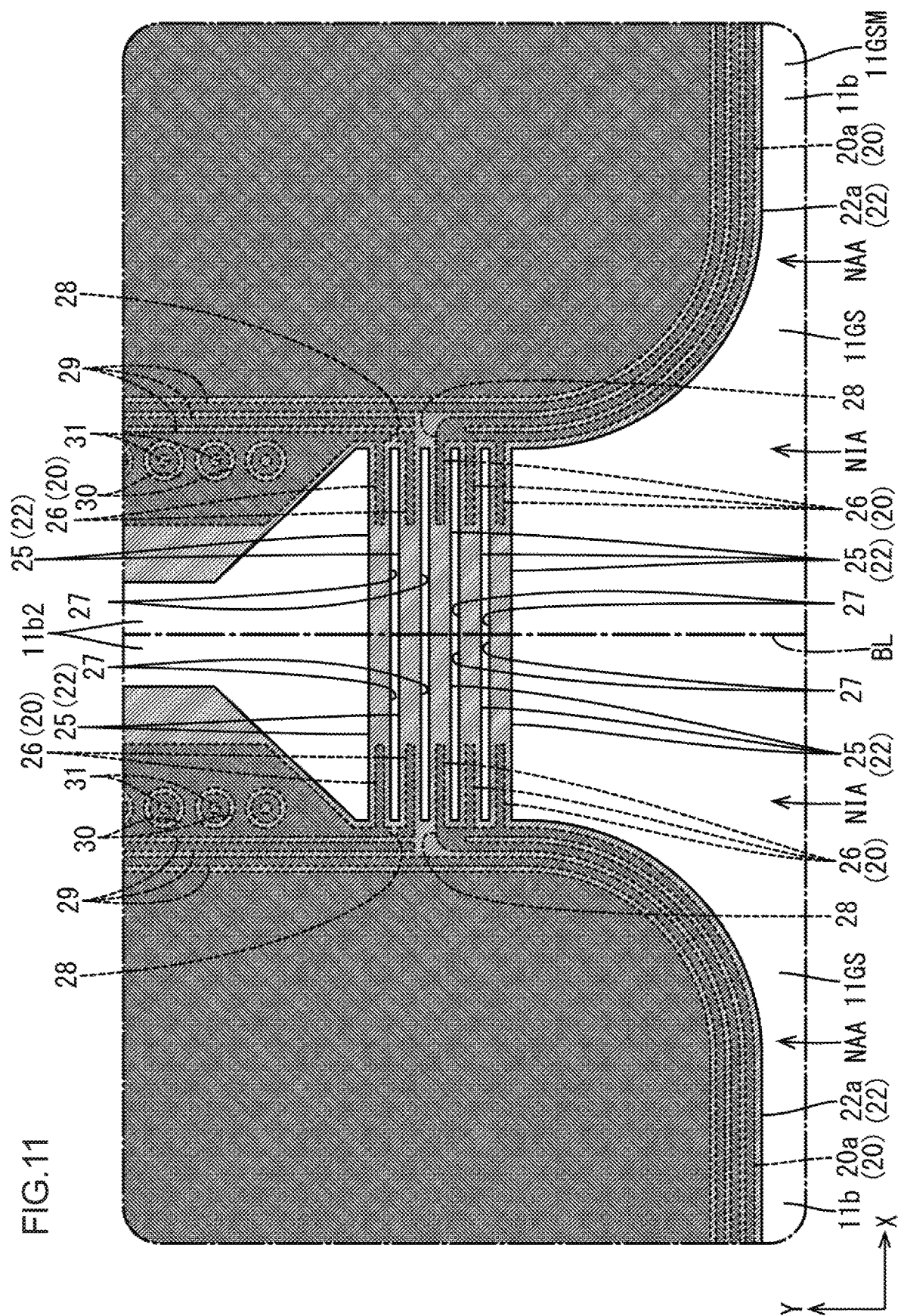
FIG. 11 is a plan view illustrating a planar configuration of a portion of a mother glass substrate including the film forming area restricting portions and the overlapping portions and therearound.

The alignment film 11*o* included in the array substrate 11*b* is disposed to extend from the display area AA to the non-display area NAA, as described earlier. An ink jetting device is used for forming the alignment film 11*o* and droplets (material) for the alignment film 11*o* that are ejected from nozzles of the ink jetting device are supplied to the non-display area NAA in addition to the display area AA. Accordingly, even if the frame width of the liquid crystal panel 11 is further reduced, unevenness is less likely to be caused in the thickness of the alignment film 11*o* at the outer edge portion of the display area AA of the array substrate 11*b* and display quality in the outer edge portion is less likely to be deteriorated. This is preferable to reduce the frame width. The droplets for the alignment film 11*o* need to spread smoothly over the display area AA and the non-display area NAA of the glass substrate 11GS included in the array substrate 11*b* without creating a non-forming portion in which the alignment film 11*o* is not formed or a uneven thickness portion. Therefore, the droplets are liquid having low viscosity. Therefore, when the droplets for the alignment film 11*o* spread over the insulator non-disposed area NIA in the non-display area NAA, the droplets are likely to flow particularly on paths along the outer edges of the main sections 20*a*, 22*a* of the planarizing film 20 and the second inter-layer insulator 22 that project from the surface of the glass substrate 11GS. Particularly, when various kinds of processes are performed on a mother glass substrate 11GSM (a substrate body component) including multiple glass substrates 11GS that are joined each other, the droplets for the alignment film 11*o* that are supplied to each of the adjacent glass substrates 11GS flow over a border (a border line BL) between the glass substrates 11GS in the insulator non-disposed areas NIA in the adjacent non-display areas NAA and join together. Therefore, fluidity is increased and the flow of the droplets for forming a film is less likely to be restricted. In FIG. 11, the border line BL between the adjacent glass substrates 11GS is indicated by a bold chain line. If the droplets for the alignment film 11*o* flow on the paths along the outer edges of the main sections 20*a*, 22*a* of the planarizing film 20 and the second inter-layer insulator 22 and reach the terminals 24 in the CF substrate non-overlapping portion 11*b*1, the terminals 24 that are sections of the first metal film 15 or the second metal film 18 may be corroded due to the moisture absorbing property of the material of the alignment film 11*o*.

Figure 8:
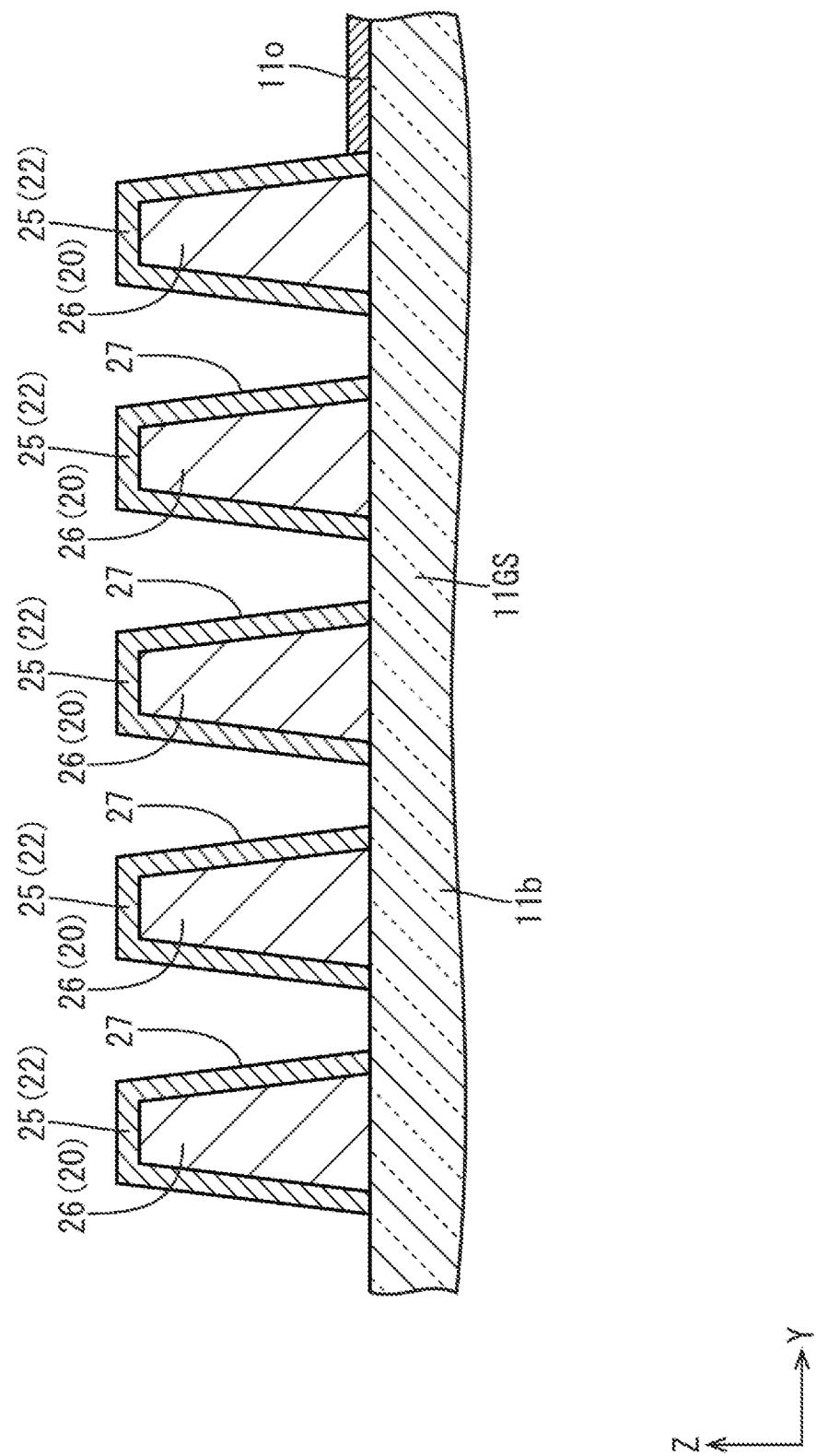
FIG. 8 is a cross-sectional view along line C-C in FIG. 6.

As illustrated in FIGS. 5, 6, and 8, the array substrate 11*b* in this embodiment includes the film forming area restricting portions 25 that are sections of the second inter-layer insulator 22 and the overlapping portions 26 that are sections of the planarizing film 20. The film forming area restricting portions 25 are disposed on the outer edge portion of the glass substrate 11GS so as not to overlap the planarizing film main section 20*a* and to restrict the forming area in which the alignment film 11*o* is to be formed. The overlapping portions 26 extend continuously from the planarizing film main section 20*a* and disposed to overlap the film forming area restricting portions 25, respectively. The film forming area restricting portions 25 extend continuously from the second inter-layer insulator main section 22*a* that overlaps the planarizing film main section 20*a*. The film forming area restricting portions 25 and the overlapping portions 26 are disposed on a pair of long-side sections 11*b*2 (a second side section) of the outer edge portion of the array substrate 11*b* and next to the CF substrate non-overlapping portion 11*b*1. The film forming area restricting portions 25 and the overlapping portions 26 extend along the X-axis direction (in a direction perpendicular to an arrangement direction in which the display area AA and the CF substrate non-overlapping portion 11*b*1 including the terminals 24 are arranged) and across the insulator non-disposed area NIA. The film forming area restricting portions 25 and the overlapping portions 26 are disposed on an edge portion of the long-side section 11*b*2 closer to the CF substrate non-overlapping portion 11*b*1 with respect to the Y-axis direction (the arrangement direction in which the display area AA and the CF substrate non-overlapping portion 11*b*1 including the terminals 24 are arranged). The film forming area restricting portions 25 extend continuously from the corner portion of the second inter-layer insulator main section 22*a* and the overlapping portions 26 extend continuously from the corner portion of the planarizing film main section 20*a*. According to such a configuration, the film forming area restricting portions 25 extending continuously from the second inter-layer insulator main section 22*a* is increased in their height (level) by the overlapping portions 26 extending continuously from the planarizing film main section 20*a*. Therefore, even if the droplets for the alignment film 11*o* flow on the paths along the outer edges of the main sections 20*a*, 22*a* of the planarizing film 20 and the second inter-layer insulator 22, the droplets for the alignment film 11*o* are restricted to flow over the film forming area restricting portions 25 having the increased height. Thus, the film forming area in which the droplets for the alignment film 11o are disposed is restricted more reliably. Further, since the film forming area restricting portions 25 whose height is increased by the overlapping portions 26 extending continuously from the planarizing film main section 20a are disposed on the edge portion of the long-side section 11b2 closer to the CF substrate non-overlapping portion 11b1, the droplets for the alignment film 11o are further less likely to reach the CF substrate non-overlapping portion 11b1. Accordingly, the droplets for the alignment film 11o are further less likely to adhere to the terminals 24 disposed on the CF substrate non-overlapping portion 11b1 of the array substrate 11b. Therefore, in the liquid crystal panel 11 obtained by bonding the array substrate 11b to the CF substrate 11a, the function of displaying can be exerted appropriately and yield can be improved.

Figure 9:
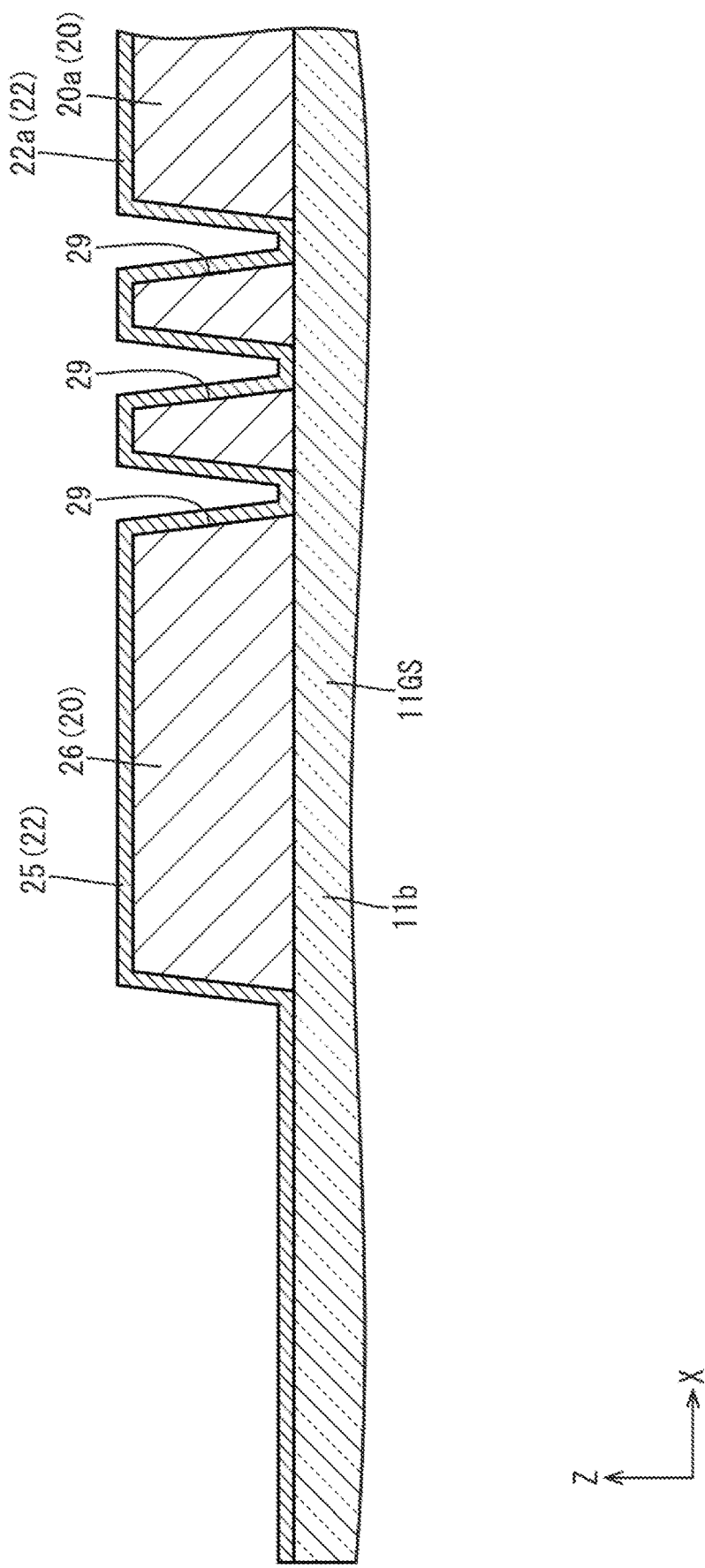
FIG. 9 is a cross-sectional view along line D-D in FIG. 6.

As illustrated in FIGS. 6 and 9, the film forming area restricting portions 25 extend to the outer edge of the glass substrate 11GS included in the array substrate 11b. Namely, the film forming area restricting portions 25 extend from the second inter-layer insulator main section 22a along the X-axis direction to the outer edge of the glass substrate 11GS so as to extend across the entire area of the insulator non-disposed area NIA. According to such a configuration, the film forming area restricting portions 25 disposed on each of the adjacent glass substrates 11GS included in the mother glass substrate 11GSM that is used for producing the array substrates 11b extend to the outer edge of each glass substrate 11GS so that the film forming area restricting portions 25 on the adjacent glass substrates 11GS are joined at a border position (a cutting position) indicated by the border line BL between the glass substrates 11GS. When the droplets for the alignment film 11o are supplied to the adjacent glass substrates 11GS included in the mother glass substrate 11GSM in forming the alignment film 11o, the forming areas of the droplets for the alignment film 11o flowing on each of the glass substrates 11GS are appropriately restricted by the film forming area restricting portions 25 that are connected to each other at the border position between the adjacent glass substrates 11GS.

Figure 7:
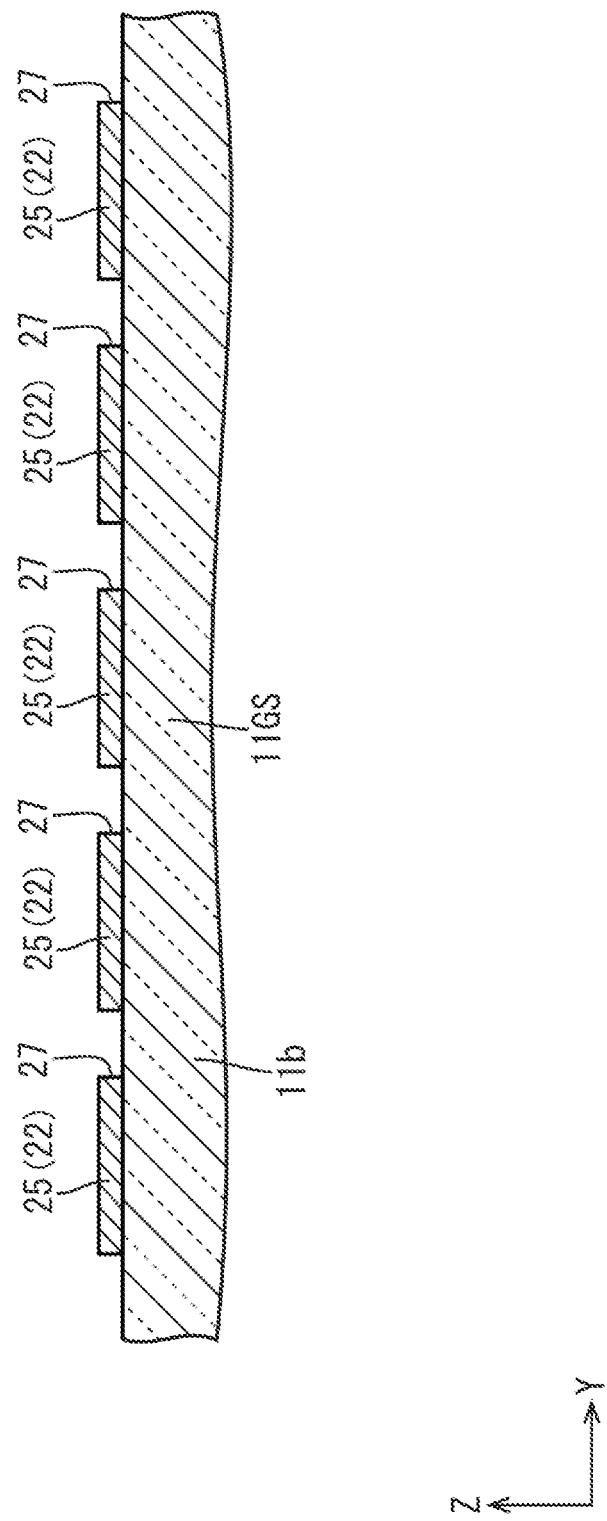
FIG. 7 is a cross-sectional view along line B-B in FIG. 6.

As illustrated in FIGS. 6 to 8, multiple (five in this embodiment) film forming area restricting portions 25 are arranged along the Y-axis direction while having slits 27 therebetween. Multiple (five in this embodiment) overlapping portions 26 are arranged at intervals so as to overlap the respective film forming area restricting portions 25. Namely, the number of the overlapping portions 26 is same as the number of the film forming area restricting portions 25 and all of the film forming area restricting portions 25 are increased in their height by the overlapping portions 26, respectively. The number of the slits 27 is a number obtained by subtracting one from the number of the film forming area restricting portions 25 or the overlapping portions 26. Each of the film forming area restricting portions 25 has a width dimension of about 60 μm, for example, and each of the slits 27 between the film forming area restricting portions 25 has a width dimension (an arrangement interval of the film forming area restricting portions 25) of about 20 μm, for example. Each of the overlapping portions 26 has a width dimension of about 20 μm, for example, and an arrangement interval of the overlapping portions 26 is about 60 μm, for example. According to such a configuration, even if the droplets for the alignment film 11o that are supplied to the glass substrate 11GS and flow on the path along the outer edge of the planarizing film main section 20a flow over the film forming area restricting portion 25 whose height is increased by the overlapping portion 26, the droplets flow into the slit 27 next to the film forming area restricting portion 25. Further, since the next film forming area restricting portion 25 is also increased in its height by the overlapping portion 26, the droplets are less likely to keep flowing on the path along the outer edge of the planarizing film main section 20a. Therefore, reliability of restricting the forming area in which the material of the alignment film 11o is disposed is further increased.

Figure 10:
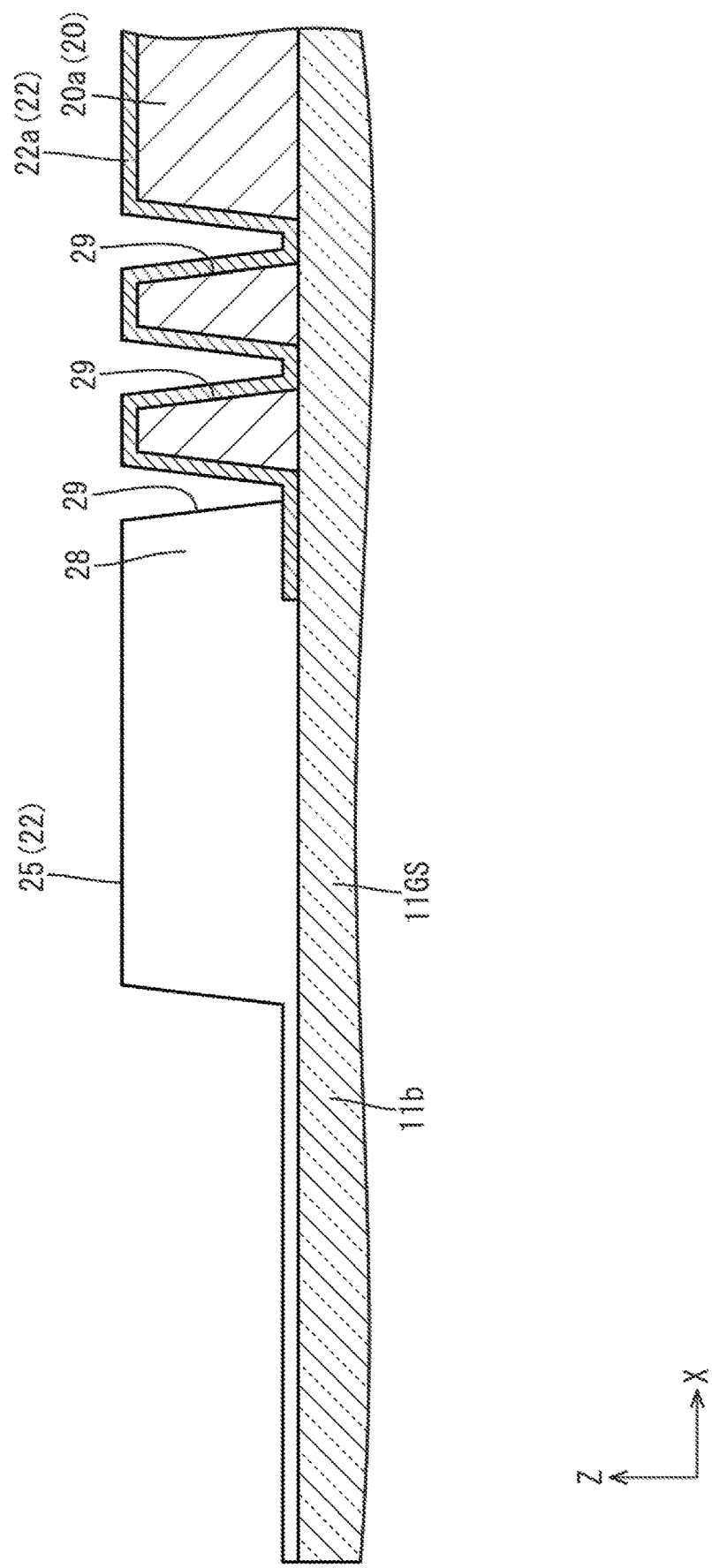
FIG. 10 is a cross-sectional view along line E-E in FIG. 6.

As illustrated in FIGS. 6 and 10, the planarizing film main section 20a includes opening holes 28 that are open to the slits 27. Two opening holes 28 are included in this embodiment. One of the opening holes 28 is open to one of the slits 27 arranged along the Y-axis direction that is disposed farthest from the CF substrate non-overlapping portion 11b1 (the terminals 24) and another one is open to one of the slits 27 that is a second farthest one from the CF substrate non-overlapping portion 11b1. Out of the two opening holes 28, the former one (the opening hole 28 that is relatively far from the CF substrate non-overlapping portion 11b1) has an opening width that is smaller than the arrangement interval between the overlapping portions 26, and the latter one (the opening hole 28 that is relatively close to the CF substrate non-overlapping portion 11b1) has an opening width that is substantially equal to the arrangement interval between the overlapping portions 26 and is relatively greater than that of the former one. Furthermore, the planarizing film main section 20a includes grooves 29 that extend along a circumferential direction of the outer edge thereof and are communicated with the opening holes 28 at portions thereof. The grooves 29 extend along a substantially entire periphery of the outer edge portion of the planarizing film main section 20a and are communicated with the two opening holes 28, respectively, at the portions thereof. According to such a configuration, the droplets for the alignment film 11o that flow into the slit 27 can be guided to the opening hole 28 included in the planarizing film main section 20a. The droplets for the alignment film 11o guided to the opening hole 28 are guided to the groove 29 that is communicated with the opening hole 28. Since the groove 29 extends along the circumferential direction and the outer edge of the planarizing film main section 20a, the droplets for the alignment film 11o that are introduced into the groove 29 flow along the extending direction of the groove 29. Accordingly, the material of the alignment film 11o that flows into the slit 27 is further less likely to flow over the next film forming area restricting portion 25. Since the grooves 29 extend over the substantially entire periphery of the planarizing film main section 20a in the outer edge portion thereof, the droplets for the alignment film 11o that spread over the glass substrate 11GS flow into the grooves 29 so that the droplets for the alignment film 11o can be stored in the grooves 29.

As illustrated in FIG. 6, multiple (three in this embodiment) grooves 29 are arranged at intervals in parallel to each other on the outer edge portion of the planarizing film main section 20a. Each of the grooves 29 has a width dimension of about 20 μm, for example, and are arranged at an arrangement interval of about 20 μm, for example. The grooves 29 include adjacent ones that are communicated with each other. Specifically, among the three grooves 29 extending in parallel to each other, one groove 29 on the outer most peripheral side and another one adjacent to the one groove 29 are communicated with each other at portions thereof in the extending direction. The two grooves 29 are communicated with each other at a communication position that is a position of one of the two opening holes 28 relatively closer to the CF substrate non-overlapping portion 11b1 in the Y-axis direction. Namely, the opening hole 28 that is relatively closer to the CF substrate non-overlapping portion 11b1 is formed through the planarizing film main section 20a to communicate the slit 27 and the groove 29 on the outermost peripheral side and to communicate the groove 29 on the outermost peripheral side and the groove 29 adjacent thereto. According to such a configuration, the droplets for the alignment film 11o that are guided from the slit 27 to the groove 29 through the opening hole 28 can be guided to the next groove 29 next to the groove 29. Namely, the droplets for the alignment film 11o are guided into the two grooves 29 and can flow along the extending directions of the two grooves 29. Therefore, the droplets for the alignment film 11o that flow into the slit 27 are further less likely to flow over the next film forming area restricting portion 25.

As illustrated in FIGS. 6 and 9, the overlapping portions 26 and the film forming area restricting portions 25 overlap not entirely over a whole length of the film forming area restricting portions 25 but each overlapping portion 26 overlaps a portion of each film forming area restricting portion 25 with respect to a length. As described earlier, the next film forming area restricting portion 25 extends across an entire area of the insulator non-disposed area NIA from the second inter-layer insulator main section 22a to the outer edge of the glass substrate 11GS. The overlapping portions 26 extend outwardly along the X-axis direction from the planarizing film main section 20a and have outer edges that are before (inside) the outer edge of the glass substrate 11GS. According to such a configuration, the overlapping portions 26, which are sections of the planarizing film 20 made of an organic insulating material, are covered with the film forming area restricting portions 25, which are sections of the second inter-layer insulator 22 made of an inorganic insulating material, over entire lengths thereof in the extending direction (the X-axis direction). Therefore, the outer edges of the overlapping portions 26 are not exposed at the outer edge of the glass substrate 11GS. Accordingly, the organic insulating material of the overlapping portions 26 is less likely to be melted out as dust into processing liquid used in the various kinds of processes performed in the process of manufacturing the array substrate 11b.

As illustrated in FIG. 6, the overlapping portions 26 and the sealant 11p overlap not entirely over a whole width of the sealant 11p but the overlapping portions 26 overlap a portion of the sealant 11p with respect to a width. The overlapping portions 26 have outer extended edges that are inside the outer peripheral edge of the sealant 11p. In FIG. 6, the outer peripheral edge of the sealant 11p is indicated by a straight chain double-dashed line extending along the Y-axis direction and an inner peripheral edge of the sealant 11p is indicated by an L-shaped chain double-dashed line. According to such a configuration, the sealant 11p includes a portion (an outer peripheral edge side portion) that does not overlap the overlapping portions 26. The overlapping portions 26 are sections of the planarizing film 20 having a greater film thickness than that of the second inter-layer insulator 22 and increase the heights of the respective film forming area restricting portions 25. This creates large gaps on the surface of the array substrate 11b. The sealant 11p includes the portion that does not overlap the overlapping portions 26 and therefore, the sealant 11p can effectively maintain the gap between the substrates 11a and 11b.

As illustrated in FIG. 6, the planarizing film main section 20a includes annular grooves 30 and recess portions 31 on an opposite side from the CF substrate non-overlapping portion 11b1 with respect to the overlapping portions 26 in the Y-axis direction. The recess portions 31 are disposed at centers of the respective annular grooves 30. The recess portions 31 have a circular plan-view shape and the annular grooves 30 have a ring plan-view shape surrounding the respective recess portions 31. The annular grooves 30 and the recess portions 31 are arranged at intervals along the Y-axis direction in the planarizing film main section 20a. Similar to the grooves 29, the droplets for the alignment film 11o that spread over the glass substrate GS in forming the alignment film 11o flow into the annular grooves 30 and the recess portions 31 and the annular grooves 30 and the recess portions 31 can store the droplets for the alignment film 11o therein.

As described above, the array substrate 11b (the substrate for a display device) in this embodiment includes the glass substrate 11GS (the substrate), the planarizing film 20 (the first insulator) disposed on the glass substrate 11GS, the second inter-layer insulator 22 (the second insulator) disposed in a layer upper than the planarizing film 20 and having a thickness smaller than that of the planarizing film 20, the alignment film 11o disposed in a layer upper than the second inter-layer insulator 22, the planarizing film main section 20a (a first insulator main section), the film forming area restricting portions 25, and the overlapping portions 26. The planarizing film main section 20a is a section of the planarizing film 20 and is disposed such that the outer edge thereof is inside the outer edge of the glass substrate 11GS and the planarizing film 20 does not overlap the outer edge portion of the glass substrate 11GS. The film forming area restricting portions 25 are sections of the second inter-layer insulator 22 and disposed on the outer edge portion of the glass substrate 11GS so as not to overlap the planarizing film main section 20a. The film forming area restricting portions 25 restrict the forming area in which the alignment film 11o is to be formed. The overlapping portions 26 are sections of the planarizing film 20 and extend continuously from the planarizing film main section 20a and overlap the respective film forming area restricting portions 25.

In such a configuration, in forming the alignment film, the material of the alignment film 11o having fluidity is supplied onto the glass substrate 11GS and the material spreads over the second inter-layer insulator 22 on the glass substrate 11GS and the alignment film 11o is formed. On the outer edge portion of the glass substrate 11GS on which the planarizing film main section 20a is not disposed, the film forming area restricting portions 25, which are sections of the second inter-layer insulator 22 disposed in a layer upper than the planarizing film 20, are disposed. Therefore, the film forming area in which the material of the alignment film 11o can be restricted on the outer edge portion of the glass substrate 11GS by the film forming area restricting portions 25.

However, the material of the alignment film 11o that is supplied to the glass substrate 11GS in forming the alignment film 11o is likely to flow particularly on the path along the outer peripheral edge of the planarizing film main section 20a. In some cases, the droplets may flow over the film forming area restricting portion 25. In this respect, the overlapping portions 26, which are sections of the planarizing film 20 having a greater film thickness than that of the second inter-layer insulator 22, extend continuously from the planarlizing film main section 20a and are disposed to overlap the respective film forming area restricting portions 25. Therefore, when the material of the alignment film 11o flows on the path along the outer peripheral edge of the planarizing film main section 20a, the material of the alignment film 11o is less likely to flow over the film forming area restricting portions 25 whose height is increased by the respective overlapping portions 26. Accordingly, the forming area in which the material of the alignment film 11o is surely restricted.

The array substrate 11b includes the second inter-layer insulator main section 22a (the second insulator film main section) that is a section of the second inter-layer insulator 22 and disposed such that an outer edge thereof is inside the outer edge of the glass substrate 11GS and the second inter-layer insulator main section 22a overlaps the planarizing film main section 20a. The film forming area restricting portions 25 extend continuously from the second inter-layer insulator main section 22a. According to such a configuration, the forming area in which the material of the alignment film 11o is supplied onto the glass substrate 11GS in forming the alignment film 11o is preferably restricted by the film forming area restricting portions 25 extending continuously from the second inter-layer insulator main section 22a that overlaps the planarizing film main section 20a.

The film forming area restricting portions 25 extend to the outer edge of the glass substrate 11GS. Accordingly, in producing the array substrate 11b, when various kinds of processes are performed on the mother glass substrate 11GSM (the substrate body component) including the multiple glass substrates 11GS that are joined each other, the film forming area restricting portions 25 disposed on each of the adjacent glass substrates 11GS included in the mother glass substrate 11GSM extend to the outer edge of each glass substrate 11GS. Accordingly, the film forming area restricting portions 25 are connected to each other at the border position between the adjacent glass substrates 11GS. When the material of the alignment film 11o is supplied to each of the adjacent glass substrates 11GS included in the mother glass substrate 11GSM in forming the alignment film 11o, the forming areas of the material of the alignment film 11o flowing on each of the glass substrates 11GS are appropriately restricted by the film forming area restricting portions 25 that are connected to each other at the border position between the adjacent glass substrates 11GS.

Multiple film forming area restricting portions 25 are arranged while having the slits 27 therebetween. Multiple overlapping portions 26 are arranged so as to overlap the respective film forming area restricting portions 25. According to such a configuration, even if the material of the alignment film 11o that is supplied to the glass substrate 11GS and flows on the path along the outer edge of the planarizing film main section 20a flow over the film forming area restricting portion 25 whose height is increased by the overlapping portion 26, the material flows into the slit 27 next to the film forming area restricting portion 25. Further, since the next film forming area restricting portion 25 is also increased in its height by the overlapping portion 26, the material is less likely to keep flowing on the path along the outer edge of the planarizing film main section 20a. Therefore, reliability of restricting the forming area in which the material of the alignment film 11o is disposed is further increased.

The planarizing film main section 20a includes the opening holes 28 opening to the slits 27. According to such a configuration, the material of the alignment film 11o flowing into the slit 27 can be guided into the opening hole 28 formed in the planarizing film main section 20a. Accordingly, the material of the alignment film 11o that flows into the slit 27 is further less likely to flow over the next film forming area restricting portion 25.

The planarizing film main section 20a includes the grooves 29 that extend along the circumferential direction of the outer edge thereof and are communicated with the opening holes 28 at portions thereof. According to such a configuration, the material of the alignment film 11o that flows into the slit 27 can be guided to the groove 29 through the opening hole 28. Since the groove 29 extends along the circumferential direction and the outer edge of the planarizing film main section 20a, the material of the alignment film 11o that is introduced into the groove 29 through the opening hole 28 flow along the extending direction of the groove 29. Accordingly, the material of the alignment film 11o that flows into the slit 27 is further less likely to flow over the next film forming area restricting portion 25.

The planarizing film main section 20a includes the grooves 29 that are arranged in parallel to each other at intervals and the adjacent grooves 29 are communicated with each other. According to such a configuration, the material of the alignment film 11o that is guided from the slit 27 to the groove 29 through the opening hole 28 can be guided to the next groove 29 next to the groove 29. Namely, the material of the alignment film 11o is guided into the grooves 29 and can flow along the extending directions of the grooves 29. Therefore, the material of the alignment film 11o that flows into the slit 27 is further less likely to flow over the next film forming area restricting portion 25.

The planarizing film 20 is made of an organic insulating material and the second inter-layer insulator 22 is made of an inorganic insulating material. Each of the overlapping portions 26 overlaps a portion of each film forming area restricting portion 25. According to such a configuration, the overlapping portions 26, which are sections of the planarizing film 20 made of an organic insulating material, extend continuously from the planarizing film main section 20a and overlaps portions of the respective film forming area restricting portions 25, which are sections of the second inter-layer insulator 22 made of an inorganic insulating material. Therefore, the outer extended edges of the overlapping portions 26 are not exposed at the outer edge of the glass substrate 11GS. Accordingly, the organic insulating material of the overlapping portions 26 is less likely to be melted out as a dust into processing liquid used in the various kinds of processes performed in the process of manufacturing the array substrate 11b.

The glass substrate 11GS includes side sections 11b1, 11b2 in the outer edge portions thereof and includes the terminals 24 mounted on the CF substrate non-overlapping portion 11b1 (a first side section) included in the side sections 11b1, 11b2. The film forming area restricting portions 25 and the overlapping portions 26 are disposed on a portion of the long-side section 11b2 (the second side section) out of the side sections 11b1, 11b2 of the outer edge portion of the glass substrate 11GS close to the CF substrate non-overlapping portion 11b1. According to such a configuration, the film forming area restricting portions 25 whose height is increased by the overlapping portions 26 extending continuously from the planarizing film main section 20a are disposed on the CF substrate non-overlapping portion 11b1 side edge portion of the long-side section 11b2. Therefore, even if the material of the alignment film 11o flows on the path along the outer edge of the planarizing film main section 20a of the planarizing film 20 from the long side section 11b2 side among the side sections 11b1, 11b2 included in the outer edge portions of the glass substrate 11GS toward the CF substrate non-overlapping portion 11b1, the material of the alignment film 11o is further less likely to reach the CF substrate non-overlapping portion 11b1. Accordingly, the material of the alignment film 11o is further less likely to adhere to the terminals 24 disposed on the CF substrate non-overlapping portion 11b1.

The liquid crystal panel 11 (the display device) in this embodiment includes the array substrate 11b and the CF substrate 11a (the counter substrate) that are opposed to the array substrate 11b while having the liquid crystal layer 11c (the inner space) therebetween. According to the liquid crystal panel 11 having such a configuration, the forming area in which the material of the alignment film 11o is formed is likely to be restricted reliably and the display function can be appropriately exerted and the yield is improved.

The liquid crystal panel 11 includes the sealant 11p that is disposed between the array substrate 11b and the CF substrate 11a to surround the liquid crystal layer 11c and seal the liquid crystal layer 11c. The overlapping portions 26 overlap a portion of the sealant 11p. Accordingly, the liquid crystal layer 11c disposed between the array substrate 11b and the CF substrate 11a is surrounded by and sealed with the sealant 11p that is disposed between the substrates 11a and 11b. Since the overlapping portions 26 overlap the portion of the sealant 11p, the sealant 11p includes a portion that does not overlap the overlapping portions 26. The overlapping portions 26 are sections of the planarizing film 20 that has a film thickness greater than that of the second inter-layer insulator 22 and increase the height of the respective film forming restricting portions 25. This creates large gaps on the surface of the array substrate 11b. Since the sealant 11p includes the portion that does not overlap the overlapping portions 26, the sealant 11p can effectively exert the function of maintaining the gap between the substrates 11a and 11b.

Second Embodiment

A second embodiment of the present invention will be described with reference to FIGS. 12 to 14. In the second embodiment section, a forming area of a second inter-layer insulator 122 is altered. Configurations, operations, and effects similar to those of the first embodiment previously described will not be described.

Figure 12:
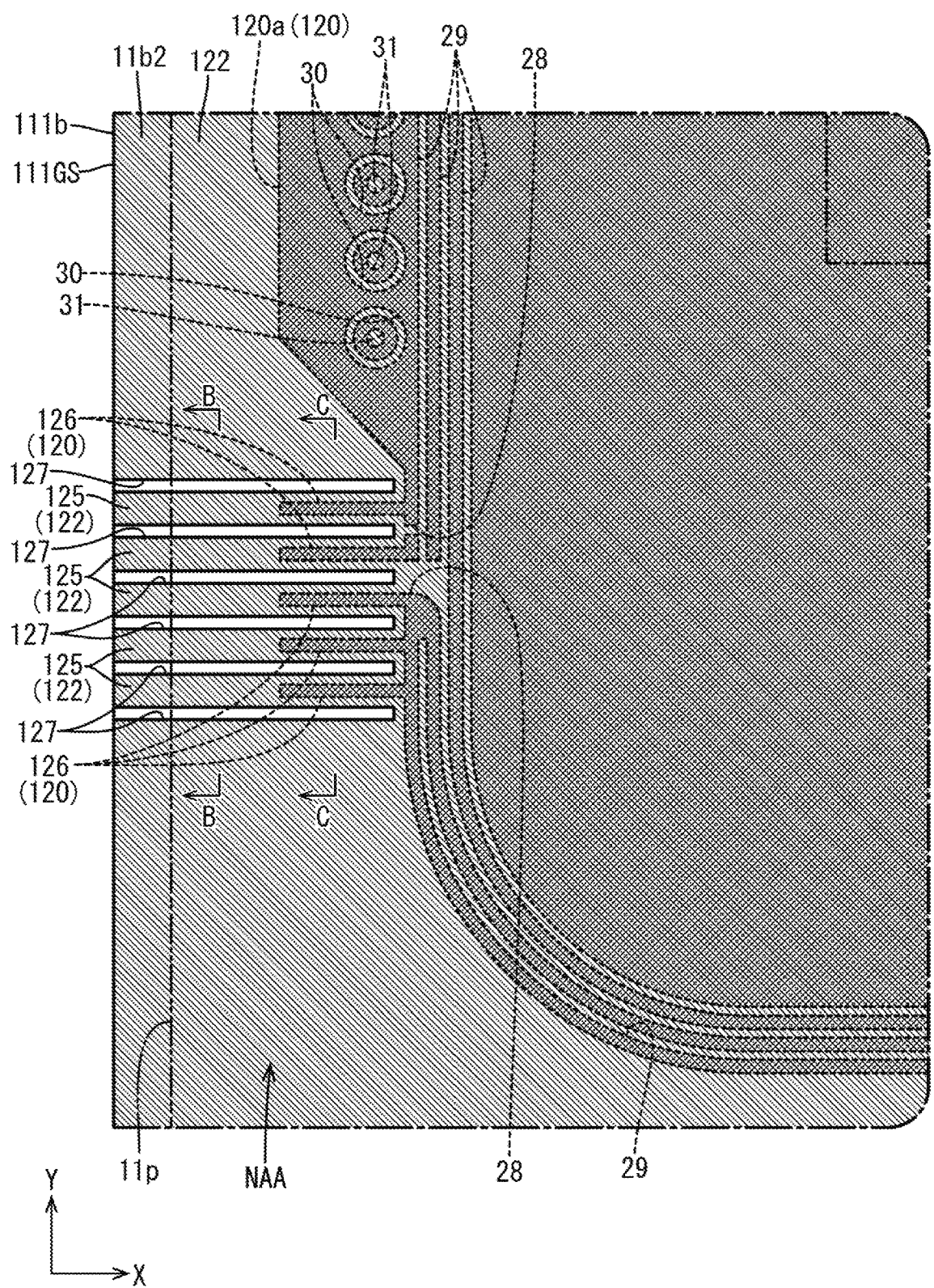
FIG. 12 is a plan view illustrating a planar configuration of a portion of an array substrate according to a second embodiment of the invention including film forming area restricting portions and overlapping portions and therearound.
Figure 13:
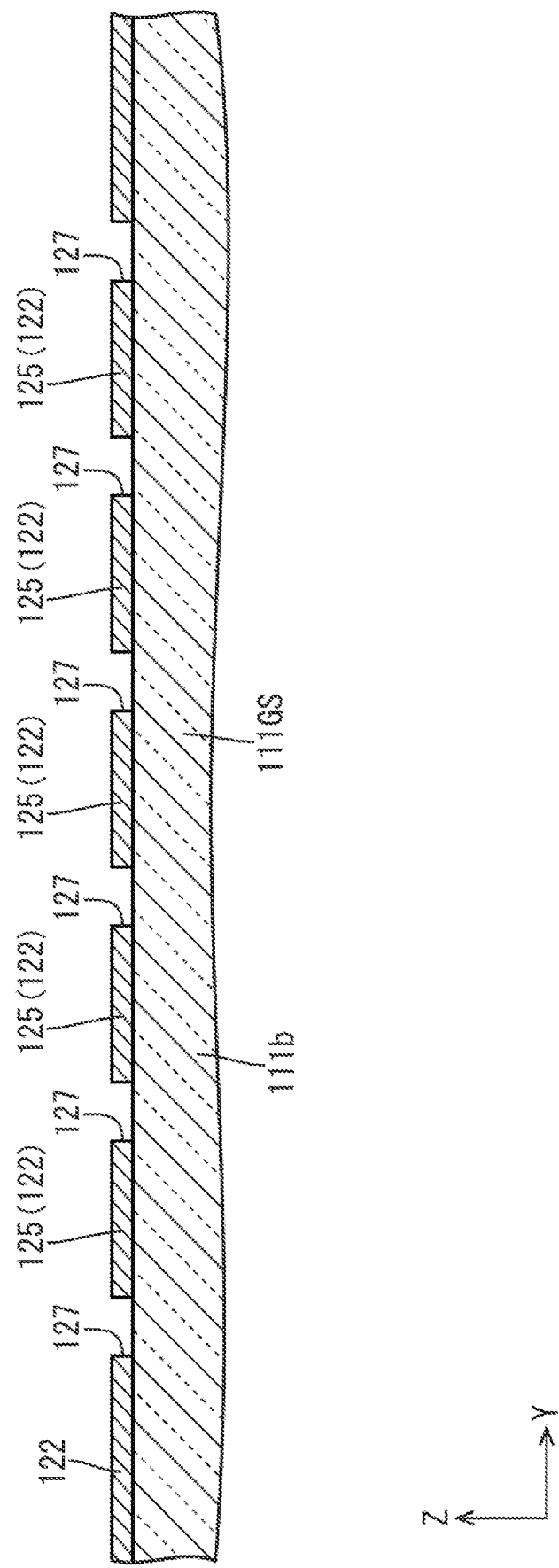
FIG. 13 is a cross-sectional view along line B-B in FIG. 12.
Figure 14:
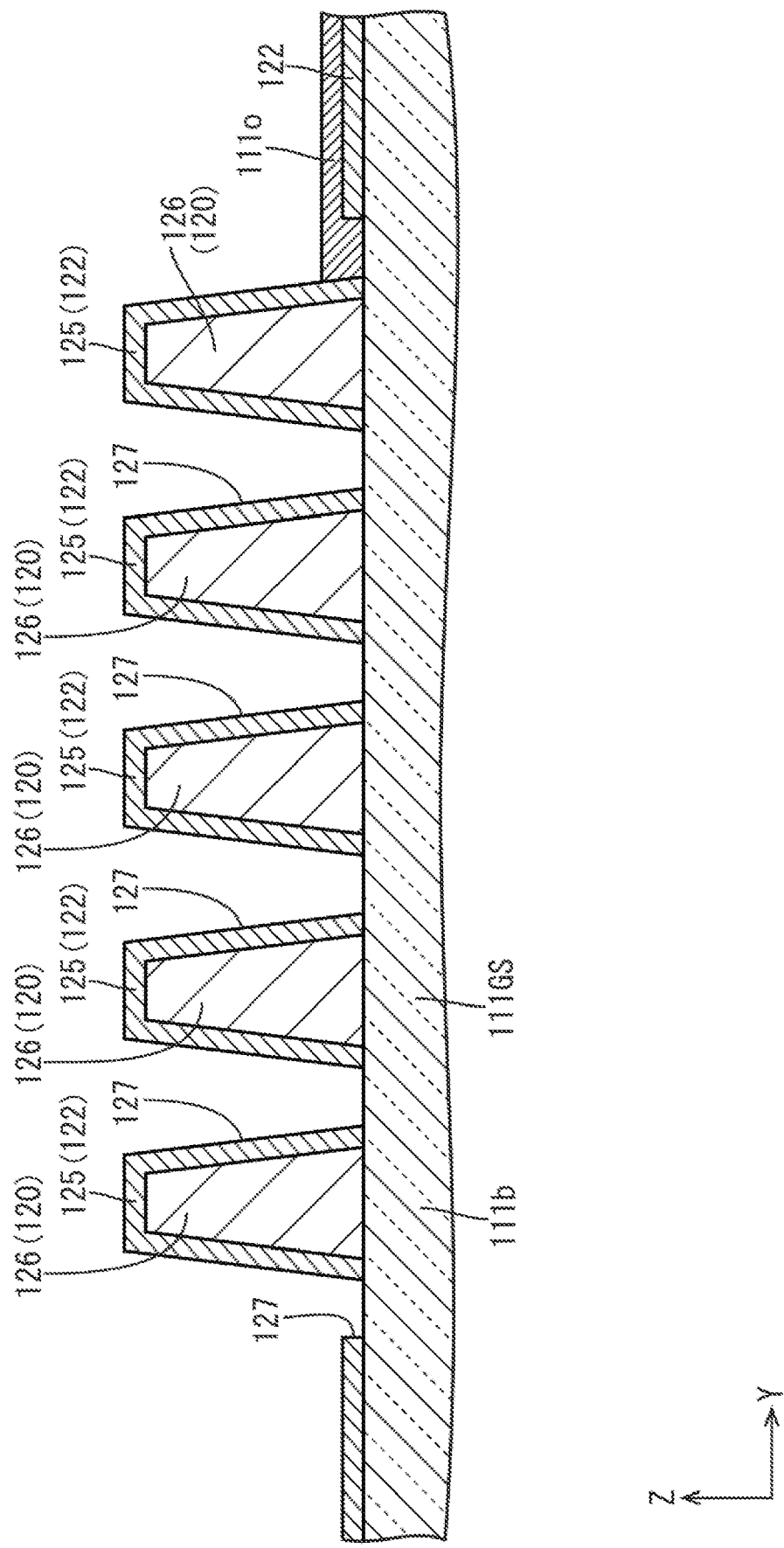
FIG. 14 is a cross-sectional view along line C-C in FIG. 12.

As illustrated in FIGS. 12 to 14, the second inter-layer insulator 122 in this embodiment is disposed in a solid manner over a substantially entire area of a glass substrate 111GS included in an array substrate 111b. Therefore, the array substrate 111b in this embodiment does not include the insulator non-disposed area NIA of the first embodiment. Film forming area restricting portions 125 are sections of the second inter-layer insulator 122 and each of the film forming area restricting portions 125 is defined by a pair of slits 127 on the both sides thereof with respect to the Y-axis direction. Therefore, the number of the slits 127 in this embodiment is a number obtained by adding one to the number of the film forming area restricting portions 125 or overlapping portions 126. According to such a configuration, similarly to the first embodiment, the film forming area restricting portions 125 are increased in their heights by the overlapping portions 126 that extend continuously from a planarizing film main section 120a. Therefore, even if droplets for an alignment film 111o flow on a path along an outer peripheral edge of the planarizing film main section 120a of the planarizing film 120, the droplets for the alignment film 111o are less likely to flow over the film forming area restricting portions 125 having the increased height.

Other Embodiments

The present invention is not limited to the embodiments described above and illustrated by the drawings. For example, the following embodiments will be included in the technical scope of the present invention.

(1) In each of the above embodiments, film forming area restricting portions extend to the outer edge of the glass substrate; however, the film forming area restricting portions may have their outer edges inside the outer edge of the glass substrate.

(2) In each of the above embodiments, the overlapping portions have their outer edges that are inside the outer peripheral edge of the sealant; however, the outer edges of the overlapping portions may be on the outer peripheral edge of the sealant or may be outside the outer peripheral edge of the sealant.

(3) In each of the above embodiments, the overlapping portions have their outer extended edges that are inside the outer edge of the glass substrate; however, the overlapping portions may extend such that the outer extended edges thereof are outside the outer edge of the glass substrate.

(4) In each of the above embodiments, the film forming area restricting portions and the overlapping portions are disposed on the CF substrate non-overlapping portion side edge portion of the long side section of the outer peripheral edge portion of the glass substrate. The specific position of the long side section where the film forming area restricting portions and the overlapping portion are disposed may be altered as appropriate other than the above.

(5) In each of the above embodiments, the opening hole is open to the slit and the groove; however, the opening hole may be open only to the slit and may not be open to the groove.

(6) In each of the above embodiments, five film forming area restricting portions are arranged at equal intervals and five overlapping portions are arranged at equal intervals; however, the number and the arrangement of the film forming area restricting portions and the overlapping portions may be altered as appropriate.

(7) In each of the above embodiments, the planarizing film main section includes two opening holes; however, the number or the arrangement of the opening holes may be altered as appropriate. A specific opening width of the opening hole may be also altered as appropriate.

(8) In each of the above embodiments, the planarizing film main section includes three grooves at substantially equal intervals; however, the number or the arrangement of the grooves may be altered as appropriate.

(9) In each of the above embodiments, the mother glass includes the glass substrates for the array substrates that are disposed directly adjacent to each other while having a border line therebetween. However, a mother glass substrate may include buffer members, which are not to be included in a product, between the glass substrates for the adjacent array substrates.

(10) In each of the above embodiments, the ink jetting device is used for forming the alignment film; however, film forming devices other than the ink jetting device may be used to form the alignment film.

(11) In each of the above embodiments, polyimide is used as the material of the alignment film; however, liquid crystal alignment material other than the polyimide may be used as the material of the alignment film.

(12) In each of the above embodiments, the photo-alignment material is used as the material of the alignment film and the photo-alignment film performs an alignment process by irradiation of ultraviolet rays of light. However, the alignment film that performs the alignment process with rubbing may be included in the present invention.

(13) In each of the above embodiments, the liquid crystal panel has a rectangular plan view shape; however, the present invention can be applied to the liquid crystal panel having a plan view shape of a rectangle, a circle, and an oval.

(14) In each of the above embodiments, the driver is mounted on the array substrate included in the liquid crystal panel with the COG method; however, the driver may be mounted on the flexible circuit board with a chip on film (COF) method.

(15) In each of the above embodiments, the semiconductor film that includes sections as the channel sections of the TFTs is made of oxide semiconductor material. However, continuous grain silicon (CG silicon) which is one kind of polysilicon (polycrystalline silicon) or amorphous silicon may be used for a material of the semiconductor film.

(16) Each of the above embodiments includes the liquid crystal panel configured to operate in FFS mode. However, the present invention can be applied to liquid crystal panels configured to operate in in-plane switching (IPS) mode, vertical alignment (VA) mode, and other modes.

(17) In each of the above embodiments, the liquid crystal panel includes the color filters of three colors of red, green, and blue. However, the present invention can be applied to a liquid crystal panel including color filters of four colors including a yellow color portion in addition to the red, green, and blue color portions.

(18) Each of the above embodiments includes the liquid crystal panel including a pair of substrates and the liquid crystal layer disposed therebetween and a method of producing the same. However, the present invention can be applied to a display panel that includes functional organic molecules (a medium layer) other than the liquid crystal material between a pair of substrates.

(19) In each of the above embodiments, the TFTs are used as the switching components of the liquid crystal panel. However, liquid crystal panels may include switching components other than the TFTs (for example, thin film diodes (TFD)). Other than the liquid crystal panels with color display, liquid crystal panels with black-and-white display may be used.

(20) In each of the above embodiments, the liquid crystal panel is provided as an example. However, other types of display panels (e.g., plasma display panels (PDP), organic EL display panels, and microcapsule electrophoretic display (EPD) panels, micro electro mechanical systems (MEMS) display panels) may be provided as other examples.

EXPLANATION OF SYMBOLS

11: Liquid crystal panel (Display device), 11a: CF substrate (Counter substrate), 11b, 111b: Array substrate (Substrate for a display device), 11b1: CF substrate non overlapping portion (Side section, First side section), 11b2: Long side section (Side section, Second side section), 11c: Liquid crystal layer (Inner space), 11o, 111p: Alignment film, 11p: Sealant, 11GS, 111GS: Glass substrate (Substrate), 11GSM: Mother glass substrate (Substrate body component), 20, 120: Planarizing film (First insulator), 20a, 120a: Planarizing film main section (First insulator main section), 22, 122: Second inter-layer insulator (Second insulator), 22a: Second inter-layer insulator main section (Second insulator main section), 24: Terminal, 25, 125: Film forming area restricting portion, 26, 126: Overlapping portion, 27, 127: Slit, 28: Opening hole, 29: Groove

The invention claimed is:

1. A substrate for a display device comprising:
a substrate;
a first insulator disposed on the substrate;
a second insulator disposed in a layer upper than the first insulator and having a thickness smaller than that of the first insulator;
an alignment film disposed in a layer upper than the second insulator;
a first insulator main section that is a section of the first insulator and is disposed on an inner side than an outer edge of the substrate such that the first insulator is not disposed on an outer edge portion of the substrate;
a film forming area restricting portion that is a section of the second insulator and is disposed on an outer edge portion of the substrate so as not to overlap the first insulator main section, and the film forming area restricting portion restricting a film forming area in which the alignment film is to be formed; and
an overlapping portion that is a section of the first insulator and extends continuously from the first insulator main section and is disposed to overlap the film forming area restricting portion, wherein:
the film forming area restricting portion includes film forming area restricting portions that are arranged while having a slit therebetween;
the overlapping portion includes overlapping portions that are arranged to overlap the film forming area restricting portions, respectively;
the first insulator main section includes an opening hole that is open to the slit; and
the first insulator main section includes a groove that extends along a circumferential direction of an outer edge of the first insulator main section and the groove is communicated with the opening hole at a portion thereof.

2. The substrate for a display device according to claim 1, further comprising a second insulator main section that is a section of the second insulator and is disposed on an inner side than the outer edge of the substrate to overlap the first insulator main section such that the second insulator does not overlap the outer edge portion of the substrate, wherein the film forming area restricting portion extends continuously from the second insulator main section.

3. The substrate for a display device according to claim 2, wherein the film forming area restricting portion extends to the outer edge of the substrate.

4. The substrate for a display device according to claim 1, wherein the groove includes grooves and the first insulator main section includes the grooves that are arranged in parallel to each other while having an interval therebetween, and the grooves that are adjacent to each other are communicated with each other.

5. The substrate for a display device according to claim 1, wherein
the first insulator is made of an organic insulating material and the second insulator is made of an inorganic insulating material, and
the overlapping portion overlaps a portion of the film forming area restricting portion.

6. The substrate for a display device according to claim 1, wherein
the substrate includes side sections in the outer edge portion thereof and terminals disposed on a first side section included in the side sections, and
the film forming area restricting portion and the overlapping portion are disposed on a second side section that is adjacent to the first side section of the side sections of the outer edge portion of the substrate and on an edge portion of the second side section closer to the first side section.

7. A display device comprising:
the substrate for a display device according to claim 1; and
a counter substrate opposed to the substrate for a display device while having an inner space therebetween.

8. The display device according to claim 7, further comprising a sealant disposed between the substrate for a display device and the counter substrate to surround the inner space and seal the inner space, wherein
the overlapping portion overlaps a portion of the sealant.

* * * * *